J. SPARENBURG.
SHAMPOOING DEVICE.
APPLICATION FILED JAN. 15, 1910.
973,822.
Patented Oct. 25, 1910.
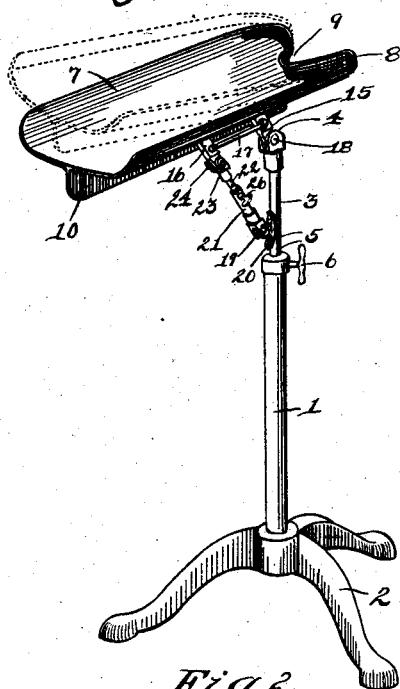
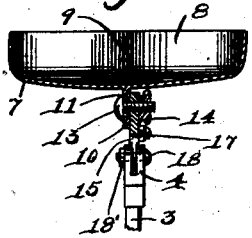
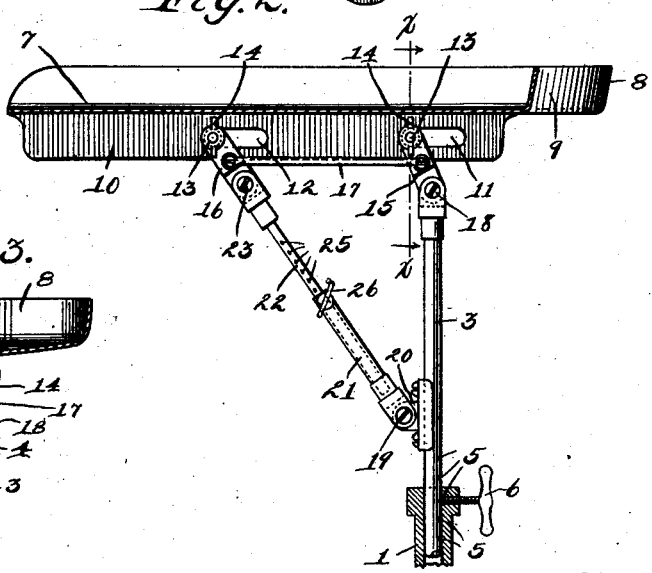
Witnesses:
C. E. Wessels.
A. A. Olson.
Inventor:
John Sparenburg,
By Joshua R. H. Potts
his Attorney.

UNITED STATES PATENT OFFICE.

JOHN SPARENBURG, OF CHICAGO, ILLINOIS.

SHAMPOOING DEVICE.

973,822.  Specification of Letters Patent.  Patented Oct. 25, 1910.

Application filed January 15, 1910. Serial No. 538,291.

*To all whom it may concern:*

Be it known that I, JOHN SPARENBURG, a citizen of the United States, residing at Chicago, county of Cook, and State of Illinois, have invented certain new and useful Improvements in Shampooing Devices, of which the following is a specification.

My invention relates to shampooing devices and has for its object the production of a device of this character wherein the shampooing tray or board embodied therein will be so mounted as to be adapted to be vertically, angularly and horizontally adjusted.

A further object is the production of a device as mentioned which will be efficient in operation and of strong, durable and economical construction.

Other objects will appear hereinafter.

With these objects in view my invention consists in a shampooing device characterized as above mentioned and in certain details of construction and arrangement of parts all as will be hereinafter fully described and particularly pointed out in the appended claims.

My invention will be more readily understood by reference to the accompanying drawings forming a part of this specification, and in which, Figure 1 is a perspective view of my device in its present preferred form, Fig. 2 is a slightly enlarged central section of the upper end portion thereof, and Fig. 3 is a transverse section taken on substantially the line *x—x* of Fig. 2.

Referring now to the drawings, 1 indicates a tubular upright or supporting member provided with a suitable flaring base 2 rigidly secured thereto. Vertically slidable within the member 1 is a rod 3, the upper extremity of which is preferably enlarged as shown and provided with a bifurcation 4. One side of said rod 3 is preferably provided with a plurality of spaced recesses 5 adapted for engagement by the inner extremity of the thumb screw 6 threaded in the upper end of the member 1, and whereby said rod may evidently be rigidly held in said member 1 at any position to which it may be adjusted therein.

7 indicates the shampooing tray or board which is of a shallow substantially rectangular form. The closed extremity 8 of said board is provided centrally therein with a circular depression 9 of a form adapting it to snugly receive the neck of the party being treated, the opposite or discharge extremity of the tray being open. Provided substantially centrally upon the under side of said tray, is a longitudinally extending depending, comparatively broad, rib 10 formed preferably integral therewith. Provided in said rib are two spaced longitudinally extending elongate slots 11 and 12, the former being positioned adjacent the end 8 of the tray, and the latter slightly forward of the center thereof. Having their upper bossed extremities loosely engaging the slots 11 and 12, the same being secured therein by bolts 13 extending through said slots and said extremities, and by thumb nuts 14 threaded upon said bolts, are depending links 15 and 16 respectively. Having its extremities loosely secured to and extending between said link is a connecting bar 17. The lower end portion of the link 15 engages the bifurcation 4 in the supporting rod 3, it being pivoted therein by a bolt or pivotal pin 18 which extends therethrough and through the sides of said bifurcation. By means of a nut 18′ threaded upon said bolt, said link may evidently be locked to said rod in any position desired.

Having its lower bifurcated extremity pivoted as at 19 to a pivotal lug 20 rigidly secured to and projecting from rod 3 adjacent its upper extremity is a projecting tubular rod 21. Slidably mounted in the tubular member 21 is a rod 22 the enlarged bifurcated outer end of which is pivotally connected by a bolt or pin 23 to the lower extremity of the link 16. By means of the nut 24 threaded upon said bolt, said link and rod may be made rigid, with said link adjusted in any desired position. Provided in one side of the rod 22 is a plurality of spaced recesses 25 adapted for engagement by the inner extremity of a thumb screw 26 threaded into the outer extremity of the member 21, and whereby said rod and hence the forward end of the tray may be rigidly locked in any position to which it may be adjusted.

From the foregoing description it will be readily seen that by loosening the thumb screw 6 the tray may be adjusted to any elevation desired, and by merely adjusting the thumb screw 26 any desired angular disposition thereof may be readily effected. Through the provision of the elongate slots 11 and 12 and the links 15 and 16 adjustably mounted therein and which connect the supporting rods 3 and 22 to the tray, the latter may also evidently be horizontally adjusted to a considerable extent. Hence with a device of this construction, because of the various adjustments afforded thereby, any desired disposition of the tray, in order to accommodate different existing conditions, may be readily effected. Further, the design shown presents a rigid construction capable of withstanding great pressure upon the tray such as is occasioned in washing and rolling the hair upon the latter.

While I have shown what I deem to be the preferable form of my device I do not wish to be limited thereto as there might be various changes made in the details of construction and the arrangement of parts described without departing from the spirit of the invention as comprehended within the scope of the appended claims. And although I have designed my device with special reference to its application as a shampooing device the same may be employed for any other purpose to which it is applicable.

Having described my invention what I claim as new and desire to secure by Letters Patent is:

1. A device of the class described comprising a base, a vertically adjustable upright comprised of telescoping sections extending above said base, a shallow tray open at one end and having a circular recess provided in the other, a link connection between said tray and said upright, an angularly disposed longitudinally adjustable rod having its lower end pivotally secured to said upright and having its upper end in linked connection with said tray for adjusting the angular disposition of the latter, substantially as described.

2. A device of the class described comprising a base, a vertically adjustable upright comprised of telescoping sections extending above said base, means for locking said sections in adjusted positions, a shallow tray open at one end and having a circular neck-receiving recess in the other end, a swinging and horizontally adjustable connection between said tray and the upper extremity of the uppermost section of said upright, means for locking said tray in adjustable position upon said upright, an angularly disposed longitudinally adjustable rod comprising telescoping sections having its lower end pivotally secured to said upright section and its upper end in pivotal and horizontally adjustable connection with said tray, means for locking said rod sections in adjusted positions, and means for locking said tray in adjustable position to said rod, substantially as described.

3. A device of the class described comprising a base, a vertically disposed tubular upright extending above said base, a rod slidable in said tubular section, means for locking said rod in adjusted position in said tubular section, a shallow tray open at one end and having a circular recess centrally provided in the other end, a swinging and longitudinally adjustable connection between said tray and the upper extremity of said rod, means for locking said tray in adjusted position upon said rod, an angularly disposed tubular member having its lower end pivotally secured to said rod, a second rod slidably carried in said angularly disposed tubular member, means for locking said second rod in said tubular member, a pivotal and horizontally adjustable connection between the upper extremity of said second rod and said tray, and means for locking said tray in adjusted position upon said second rod, substantially as described.

In testimony whereof I have signed my name to this specification in the presence of two subscribing witnesses.

JOHN SPARENBURG.

Witnesses:
   HELEN F. LILLIS,
   JOSHUA R. H. POTTS.